Oct. 17, 1933.  R. NOTVEST  1,931,466

ARC WELDING ELECTRODE

Filed Nov. 19, 1932

Inventor
ROBERT NOTVEST,

By
Attorney

Patented Oct. 17, 1933

1,931,466

UNITED STATES PATENT OFFICE 1,931,466

ARC WELDING ELECTRODE

Robert Notvest, Indianapolis, Ind., assignor to J. D. Adams Manufacturing Company, Indianapolis, Ind., a corporation of Indiana Application November 19, 1932
Serial No. 643,342

10 Claims. (Cl. 219—3)

My invention is concerned with coated electrodes for use in arc-welding and has among its objects to produce an electrode coating which will be highly water-resistant, to produce a coating which will create a very small amount of slag whereby the electrode is adapted for overhead work and work on vertical surfaces, to produce an electrode-coating which will surround the arc with a reducing vapor containing carbon in such form that it will be absorbed by the fusion metal, and to provide an improved process for coating electrodes with a coating of the character I find advantageous.

Figure 1:
Figure 2:

In the accompanying drawing, which illustrates my invention, Figs. 1 and 2 are longitudinal and transverse sections respectively through a coated welding rod, wherein 10 represents the base rod and 11 the coating thereon.

The basis of my invention is my discovery of the adaptability of certain synthetic resins of the coumarone, para-coumarone, or para-indene type for use in the coatings of arc-welding electrodes. These resins are highly water-resistant, are nitrogen-free, and are decomposed by the arc to form an arc-enveloping vapor containing carbon-monoxide from which, as is well known, carbon will be absorbed by the molten fusion metal to increase the carbon-content and the tensile strength of the weld. The coumarone resin may either be incorporated as an ingredient of the coating or, if the production of a water-proof coating is the chief end in view, it may be applied as a thin coating on a flux-coating of any desired composition.

The coumarone resins are decomposed by the welding arc to form carbon monoxide which, as is well known, constitutes a highly satisfactory enclosing vapor for a welding arc. The coumarone resins, however, can not well be used alone as an arc-electrode coating, because they are not uninflammable, and therefore might tend to burn spontaneously if once ignited. To render these resins adaptable for electrode-coating, it therefore becomes necessary to include in the coating other ingredients which will retard the combustion of the coating to such an extent that it will not proceed spontaneously.

These other ingredients which are added to the coumarone in the coating to retard the rate of combustion may be such as will have no other function; but obviously, no substance should be used as a combustion-retarding ingredient which will have a deleterious effect upon the arc or upon the fusion metal, and preferably, the combustion-retarding ingredients are of such a nature as will actually further the production of a stable arc, increase the speed of welding, and improve the quality of the fusion metal. Substances which are satisfactory combustion-retarding agents and which at the same time are desirable for other reasons include: magnesium and calcium carbonates, which increase the rate of thermionic emission; titanium oxide or other titanium compounds, which have the same property and which, in addition, tend to prevent the inclusion of sulphur and phosphorus in the fusion metal; manganese carbonate or manganese in other form, which prevents or counteracts the tendency of carbon monoxide to deprive the fusion metal of manganese; sodium silicate or other slag-forming substances, if a slag is desired; and ferric oxide, which prevents slag-inclusions in the fusion metal and in addition increases the speed of welding.

As previously indicated, if it is desired merely to render an electrode-coating waterproof by the use of a coumarone resin, the resin may be applied in a thin layer to the surface of the coating. In such a situation, because of the thinness of the resin film, it will not be necessary to incorporate any combustion-retarding ingredients with it.

If the coumarone resin is to be embodied in the electrode-coating as a substantial part thereof, several different methods of applying the coating are available. For example, the resin may be liquefied, either by means of heat or with a suitable solvent, the other ingredients suspended therein, and the electrode dipped in the mixture until a coating of the desired thickness is built up; or, if desired, the resin may be powdered and suspended with other solid ingredients in a liquid binder, and the electrodes repeatedly dipped and dried. In a preferred example of coating electrodes by the latter method, only a small quantity of the liquid binder is used, and after each dipping the electrode is dried and heated to a temperature sufficient to melt the coumarone resin.

An example of a coating of the first type just mentioned may comprise 1 part by weight of calcium carbonate, 1 part by weight of barium carbonate, 2 parts by weight of titanium dioxide, and sufficient of the coumarone resin dissolved in naphtha to serve as a binder. In producing the coating composition, the binder is prepared by dissolving about 5 pounds of the coumarone resin in 1 gallon of naphtha, and the other ingredients, in the approximate proportions noted, are suspended in this solution. The electrodes are then coated by dipping them repeatedly into the coating mixture, the electrodes being dried between dipping operations. Of course, any other coumarone solvent, such as benzol or xylol might be used in place of the naphtha. The calcium carbonate, barium carbonate, and titanium dioxide are only examples of a vast number of constituents which I find suitable for use and may be replaced by any combustion-retarding ingredients, and preferably by combustion-retarding ingredients of the type commonly used in electrode-coatings for the purpose of stabilizing and protecting the arc and improving the character of the weld.

It may under certain circumstances be considered undesirable to dissolve the coumarone resin in a solvent and use the resultant solution as a binder. If this is the case, the coumarone resin can be incorporated in the electrode-coating by reducing it to a powder and by suspending it with the other ingredients of the coating in a binder such as a sodium silicate solution. In coating electrodes with such a composition, the electrode is dipped repeatedly until a coating of the desired thickness is built up. Between each dipping, the electrode is subjected to heat to expel the water of the sodium silicate solution and is preferably heated to a temperature above the melting point of the coumarone resin so that it will fuse and form a binder.

A coating of the type just mentioned may comprise any desired combustion-retarding ingredients. The solid ingredients are suspended in the silicate of soda solution and the electrodes are dipped therein and dried. Preferably, the drying operation is conducted slowly in order to avoid the creation in the coating of bubbles of water-vapor or steam. For example, the dipped electrode may be subjected to a temperature of 150° F. for 15 minutes, to 200° F. for 15 minutes, and to 250° F. for an additional 15 minutes. This increase of temperature in 50° steps at fifteen-minute intervals is continued until the melting point of the coumarone resin is exceeded. After this drying, the electrode is again dipped and dried, the process being repeated until a coating of the desired thickness is produced.

In the finished electrode produced by the above process, the real binding function is performed by the coumarone resin which has been fused between successive dips of the electrode in the coating composition. The quantity of silicate of soda present is insufficient to produce a satisfactory binding action, and if the coumarone resin were not fused during the drying operation, the coating could readily be stripped from the electrode with the fingers. After the coumarone resin has been fused, however, a very satisfactory coating is produced which adheres strongly to the electrode.

Further, the coating thus produced, although relatively hard, is flexible rather than brittle and is not subject to damage from chipping.

Obviously, the coating method above described may be used with coating-compositions which include, in place of coumarone resins, other synthetic resins or similar materials which are insoluble in the temporary liquid binder used and which can be melted after the coating is dried to form a permanent binder.

As an example of a comparatively slagless coating, I may mention one comprising the following ingredients in the approximate proportions indicated:

| | Lbs. |
|---|---|
| Ferric oxide | 11¼ |
| Titanium dioxide | 45 |
| Manganese carbonate | 75 |
| Calcium carbonate or magnesium carbonate | 11¼ |
| Coumarone resin | 37½ |
| Silicate of soda solution, 40° Beaumé | 150 |

It may be, and usually is, desirable to thin the above mixture with the addition of about 4 gallons of water.

As before, the solid ingredients are suspended in the sodium silicate solution, and the electrodes are dipped repeatedly, being dried between successive dippings by the gradual increase of temperature as set forth above, the maximum temperature being above the melting point of the coumarone resin used. The number of dippings will obviously depend upon the thickness of coating desired, and this in turn will usually depend on the diameter of the actual electrode. For example, I dip a ³⁄₁₆ inch electrode four times, a ¼ inch electrode six times, and a ⁵⁄₁₆ inch electrode seven times.

The coating produced as just described is relatively slagless. The silicate of soda is in large part driven off from the arc in the form of smoke. The titanium oxide and manganese carbonate vaporize and probably are in part absorbed. The coumarone resin burns completely and forms no solid ash. Substantially the only slag produced is that resulting from the presence in the coating of calcium and magnesium carbonates augmented by such of the sodium silicate as is not driven off in the form of smoke and by such of the ferric oxide as is not reduced and incorporated in the fusion metal.

The proportions of the ingredients employed in the coating last described are susceptible of considerable variation. If a relatively slagless coating is desired, the proportions of silicate of soda and ferric oxide should be kept low, only sufficient sodium silicate being used to form a satisfactory temporary binder and only sufficient ferric oxide to produce the desired speed of welding. The coumarone resin, if present in quantity much less than five per-cent of the solid ingredients of the coating has an inappreciable beneficial effect, while if present in quantity much more than twenty per-cent tends to burn.

An electrode especially suitable for overhead welding may be produced with the following coating composition:

| | Lbs. |
|---|---|
| Sodium silicate solution 40° Baumé | 125 |
| Ferric oxide | 5 |
| Titanium dioxide | 15 |
| Manganese carbonate | 15 |
| Calcium carbonate | 15 |
| Sodium tetraborate (anhydrous) | 3 |
| Coumarone resin | 15 |

The above ingredients are thoroughly mixed and applied to the rod as in the case of the last coating-composition set forth above. In mixing the ingredients of the composition, I find it desirable to add the sodium tetraborate last and to have it in a finely powdered state in order to secure its even distribution throughout the coating. I prefer anhydrous sodium tetraborate rather than commercial borax because it is more easily powdered.

Electrodes coated with the above composition form a very thin scale on the surface of the fusion metal. Owing to the presence of the sodium tetraborate, this thin scale tends to crack as the fusion metal cools; and in an overhead weld, a large part of the scale will fall from the face of the fusion metal under the influence of gravity. The remainder can be readily removed with a stiff brush.

The coumarone resins constitute a series of compounds formed by successive polymerizations of simple coumarone ($C_8H_6O$). Their melting points cover a wide range from as low as 50° F. to as high as 325° F. or even higher. Naturally, I prefer to use resins which will not liquefy at the temperature to which the body of the electrode is subjected during the welding operation, and for this reason, I prefer to use the resins which have a melting point in excess of 250° F.

The coumarone resin is decomposed by the arc with the formation of carbon monoxide. This produces a reducing atmosphere which prevents the formation of iron oxides in the welding metal and which also gives up a part of its carbon to the fusion metal with the formation of carbon dioxide, thus increasing the carbon content of the weld and increasing its tensile strength materially. Thus, using an iron electrode containing 0.06% carbon and having a tensile strength of 50,000 pounds per square inch, I have been able consistently to produce welds having a tensile strength of 65,000–70,000 pounds per square inch with a coating including a substantial quantity of a coumarone resin. To an extent, the increased carbon-content and tensile strength of the weld will be generally proportional to the amount of coumarone resin in the coating.

I find that the presence of carbon monoxide in the vapor surrounding the arc has a tendency to decrease the manganese content of the weld metal. As a result, unless steps are taken to prevent it, an electrode having a 0.40% to 0.50% manganese-content will produce a weld in which the manganese content is as low as 0.10% or even less. I find that this tendency of the carbon monoxide to deprive the fusion metal of manganese can be corrected by using a suitable manganese compound such as manganese carbonate, in the coating; and that is one function of the manganese carbonate included in the composition last set forth above.

The coumarone resins are highly water-resisting and, when incorporated in substantial proportions in the coating composition, prevent damage of the electrode-coating by moisture. Thus, an electrode coated with any of the compositions set forth above may be immersed in water for 48 hours or even longer without the coating softening or sloughing off.

This same advantage can be obtained by merely covering an electrode having a flux-coating of any desired composition with a thin layer of a coumarone resin. In this operation, the coumarone resin might be melted, but is preferably dissolved in a suitable solvent. However the coumarone is liquefied, the coated electrodes are dipped into it and permitted to drain and dry.

I claim as my invention:

1. An electrode suitable for use in arc-welding and comprising a ferrous rod having a coating of fluxing material and a second coating of a coumarone resin applied to said first coating, said coumarone resin having a melting point above 250° F.

2. An electrode suitable for use in arc-welding and comprising a ferrous rod having a coating of fluxing material and a second coating of a coumarone resin applied to said first coating.

3. An electrode suitable for use in arc-welding and comprising a ferrous rod having a coating of fluxing material including a coumarone resin, said coumarone resin constituting less than 20% of the coating.

4. An electrode suitable for use in arc-welding and comprising a ferrous rod having a coating of fluxing material comprising a mixture of arc-stabilizing metallic salts and a coumarone resin, said coumarone resin constituting less than 20% of the coating.

5. An electrode suitable for use in arc-welding and comprising a ferrous rod having a coating of fluxing material comprising a mixture of arc-stabilizing material and a coumarone resin having a melting point above 250° F., said coumarone resin constituting less than 20% of the coating.

6. An electrode suitable for use in arc-welding and comprising a ferrous rod having a coating of fluxing material comprising a mixture of arc-stabilizing material and a coumarone resin, said coumarone resin constituting less than 20% of the coating.

7. An electrode suitable for use in arc-welding and comprising a ferrous rod having a coating of fluxing material comprising a mixture of arc-stabilizing material and a binder of coumarone resin.

8. The method of coating welding electrodes which comprises dipping the electrode into a mixture comprising a powdered coumarone resin, slag-forming ingredients, and a liquid binder in which the coumarone is insoluble, drying the coating thus produced, and subsequently heating the electrode to a temperature above the melting point of the coumarone resin but below the temperature at which any chemical reaction between coating-ingredients will take place.

9. The method of coating welding electrodes which comprises dipping the electrode into a mixture comprising a powdered synthetic resin, slag-forming ingredients, and a liquid binder in which the resin is insoluble, drying the coating thus produced, and subsequently heating the electrode to a temperature above the melting point of the synthetic resin but below the temperature at which any chemical reaction between coating-ingredients will take place.

10. An electrode suitable for use in arc-welding, and comprising a ferrous rod having a coating composed principally of a mixture of a coumarone resin and non-inflammable substances, the latter being present and distributed through the coating in sufficient quantity to prevent spontaneous burning of the coating.

ROBERT NOTVEST.